US 6,717,963 B1

(12) United States Patent
Foursa

(10) Patent No.: US 6,717,963 B1
(45) Date of Patent: Apr. 6, 2004

(54) RAMAN FIBER AMPLIFIER USING A WIDE BANDWIDTH CONTINUOUS WAVE PUMP

(75) Inventor: Dmitri Foursa, Freehold, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 143 days.

(21) Appl. No.: 09/616,410

(22) Filed: Jul. 14, 2000

(51) Int. Cl.[7] .................................................. H01S 3/30
(52) U.S. Cl. .............................. 372/3; 359/334; 372/6
(58) Field of Search ...................... 372/3, 6; 359/334

(56) References Cited

U.S. PATENT DOCUMENTS

| 4,616,898 | A | | 10/1986 | Hicks, Jr. ................ 350/96.15 |
| 5,623,508 | A | * | 4/1997 | Grubb et al. ................... 372/3 |
| 6,052,219 | A | | 4/2000 | Kidorf et al. ............... 359/334 |
| 6,147,794 | A | * | 11/2000 | Stentz ....................... 359/334 |
| 6,239,903 | B1 | * | 5/2001 | Islam et al. ................. 359/337 |
| 6,356,385 | B1 | * | 3/2002 | Digonnet et al. ........... 359/337 |
| 6,374,006 | B1 | * | 4/2002 | Islam et al. .................... 385/15 |
| 6,384,963 | B2 | * | 5/2002 | Ackerman et al. .......... 359/334 |
| 6,414,786 | B1 | * | 7/2002 | Foursa ....................... 359/334 |
| 2002/0075560 | A1 | * | 6/2002 | Foursa ....................... 359/334 |

FOREIGN PATENT DOCUMENTS

| EP | 0139081 | 5/1985 | ............. H04B/9/00 |
| EP | 0339840 | 11/1989 | ............. H04B/9/00 |

* cited by examiner

Primary Examiner—Paul Ip
Assistant Examiner—Leith Al-Nazer

(57) ABSTRACT

A method and system by which a wide bandwidth continuous wave (CW) or substantially continuous wave composite (SCWC) pump with a flat spectrum is utilized to amplify an information-carrying signal. By using a wide bandwidth CW pump, substantially no ripple is introduced to the signal being amplified by the Raman amplifier.

9 Claims, 7 Drawing Sheets

RAMAN FIBER AMPLIFIER USING A WIDE BANDWIDTH CONTINUOUS WAVE PUMP

FIELD OF THE INVENTION

This invention pertains to Raman amplifiers and, more particularly, to Raman amplifiers utilizing a wide bandwidth continuous wave (CW) overall power spectrum pump signal.

BACKGROUND OF THE INVENTION

Optical fiber technology is currently utilized in communications systems to transfer information, e.g., voice signals and data signals, over long distances as optical signals. Over such long distances, however, the strength and quality of a transmitted optical signal diminishes. Accordingly, techniques have been developed to regenerate or amplify optical signals as they propagate along an optical fiber.

One well-known amplifying technique exploits an effect called Raman scattering to amplify an incoming information-bearing optical signal (referred to herein as a "signal wavelength"). Raman scattering describes the interaction of light with molecular vibrations of the material through which the light propagates (referred to herein as the "transmission medium"). Incident light scattered by molecules experiences a downshift in frequency from the power-bearing optical signal (referred to herein as the "pump wavelength"). This downshift in frequency (or increase in wavelength) from the pump wavelength is referred to as the "Stokes Shift." The downshift of the peak gain from the pump wavelength is referred to herein as the "peak Stokes shift." The extent of the downshift and the shape of the Raman gain curve is determined by the molecular-vibrational frequency modes of the transmission medium. In amorphous materials, such as silica, molecular-vibrational frequencies spread into bands which overlap and provide a broad bandwidth gain curve. For example, in silica fibers, the gain curve extends over a bandwidth of about 300 nm from the pump wavelength and has a peak Stokes shift of about 100 nm.

The overall concept of Raman scattering is well known and is described in numerous patents and publications, for example, R. M. Stolen, E. P. Ippen, and A. R. Tynes, "Raman Oscillation in Glass Optical Waveguides," Appl. Phys. Lett, 1972 v. 20, 2 PP62–64; and R. M. Stolen, E. P. Ippen, Raman Gain in Glass Optical Waveguides," Appl. Phys. Lett, 1973 v. 23, 6 pp. 276–278), both of which are incorporated herein by reference. With respect to the present invention, the most relevant aspect of Raman scattering is its effect on signal wavelengths traveling along the transmission medium.

FIG. 1 illustrates a prior art optical amplifier which utilizes Raman scattering to amplify a signal wavelength. Referring to FIG. 1, a pump wavelength $\omega p$ and a signal wavelength $\omega s$ are effected (e.g., co-injected) into a Raman-active transmission medium 10 (e.g., fused silicon) in opposite directions. As used herein, the term "effected" used in connection with the placement of signals on a transmission medium refers broadly to taking any action or participating in any way that results in signals being propagated onto an optical fiber. Co-propagating pumps can be used, although a counter-propagation pump scheme reduces polarization sensitivity and cross talk between wavelength division multiplexed (WDM) channels. Providing that the wavelength of the signal wavelength $\omega s$ is within the Raman gain of power wavelength $\omega p$ (e.g., about 300 nm in silica), the signal wavelength $\omega s$ will experience optical gain generated by, and at the expense of, the pump wavelength $\omega p$. In other words, the pump wavelength $\omega p$ amplifies the signal wavelength $\omega s$ and, in so doing, it is diminished in strength. This gain process is called stimulated Raman scattering (SRS) and is a well-known technique for amplifying an optical signal. The two wavelengths $\omega p$ and $\omega s$ are referred to as being "SRS coupled" to each other. Isolator 16 provides unidirectional propagation and reduces multipath Rayleigh scattering in the signal bandwidth. It can also incorporate a filter which transmits all signals of the signal wavelength $\omega s$ and blocks signals of the pump wavelength $\omega p$ thereby filtering out the pump wavelength.

FIGS. 2A–2C illustrate the gain curve for a signal wavelength $\omega s$ amplified using a single narrow band pump wavelength $\omega p$ of a specific frequency. As shown in FIGS. 2B and 2C, while gain occurs over a broad bandwidth, less than about 35 nm (the area between point A and point B) is, from a practical standpoint, useable to effectively amplify the signal wavelength $\omega s$. The area between points A and B is the bandwidth where gain variation is less than 3dB, i.e., less than two times gain variation.

To increase the useable gain beyond this width, it is known to utilize multiple narrow band single wavelength pumps as described in U.S. Pat. No. 4,616,898 to Hicks, Jr., incorporated fully herein by reference. As shown in FIGS. 3A–3C, when multiple single wavelength pumps $\omega p1$, $\omega p2$, and $\omega p3$ are generated having small wavelength separations, a composite gain curve is generated from the amplified signal wavelengths $\omega s$ 123 which approaches a uniform amplification level. However, as can be seen in FIG. 3C, a certain gain ripple still exists, the magnitude of which depends upon the number of signal wavelengths and the wavelength separation between them. In a pure silica fiber, the gain ripple associated with discrete pump wavelengths, although as small as 0.05 dB, is still present when the separation between the pump signals is as small as 1 nm.

Thus, while prior art multiple-pump Raman amplifiers produce an amplified output with a minimal amount of ripple in the output, it would be desirable to have a Raman amplifier producing a ripple-free output.

SUMMARY OF THE INVENTION

The present invention provides a method and apparatus by which a wide bandwidth continuous wave (CW) or substantially continuous wave composite (SCWC) pump with a substantially flat spectrum is utilized to amplify an information-carrying signal. By using a wide bandwidth CW pump, substantially no ripple is introduced to the signal being amplified by the Raman amplifier.

Accordingly, one aspect of the present invention is a method of generating a ripple-free amplified optical signal by using wide bandwidth continuous wave pumps. In a preferred embodiment, the method comprises the steps of: effecting an information-bearing optical signal onto a Raman-active transmission medium in a first direction; and effecting a wide spectral bandwidth continuous wave (CW) pump signal onto the Raman-active transmission medium in a direction opposite to that of the information-bearing optical signal. The wide spectral bandwidth CW pump signal should have a bandwidth that is greater than the bandwidth of the information-bearing optical signal, and in a more preferred embodiment, the wide spectral bandwidth CW pump signal has a bandwidth of at least 3 nm.

In an alternative embodiment, the method comprises the steps of: effecting an information-bearing optical signal onto a Raman-active transmission medium in a first direction; and effecting a wide spectral bandwidth substantially continuous wave composite (SCWC) pump signal onto the Raman-active transmission medium in a direction opposite to that of the information-bearing optical signal.

Yet another aspect of the present invention is an amplification system for generating a ripple-free amplified optical signal. In a preferred embodiment, the amplifier system comprises: a transmission medium coupled to an information-signal source; a pump source generating a wide spectral bandwidth continuous wave (CW) pump signal; and a coupler for coupling a pump signal generated by the pump source to the transmission medium. The pump source can comprise a single wide spectral bandwidth pump source or a plurality of wide spectral bandwidth pump sources.

DETAILED DESCRIPTION OF THE PREFERRED EMBODIMENT

Figure 1:
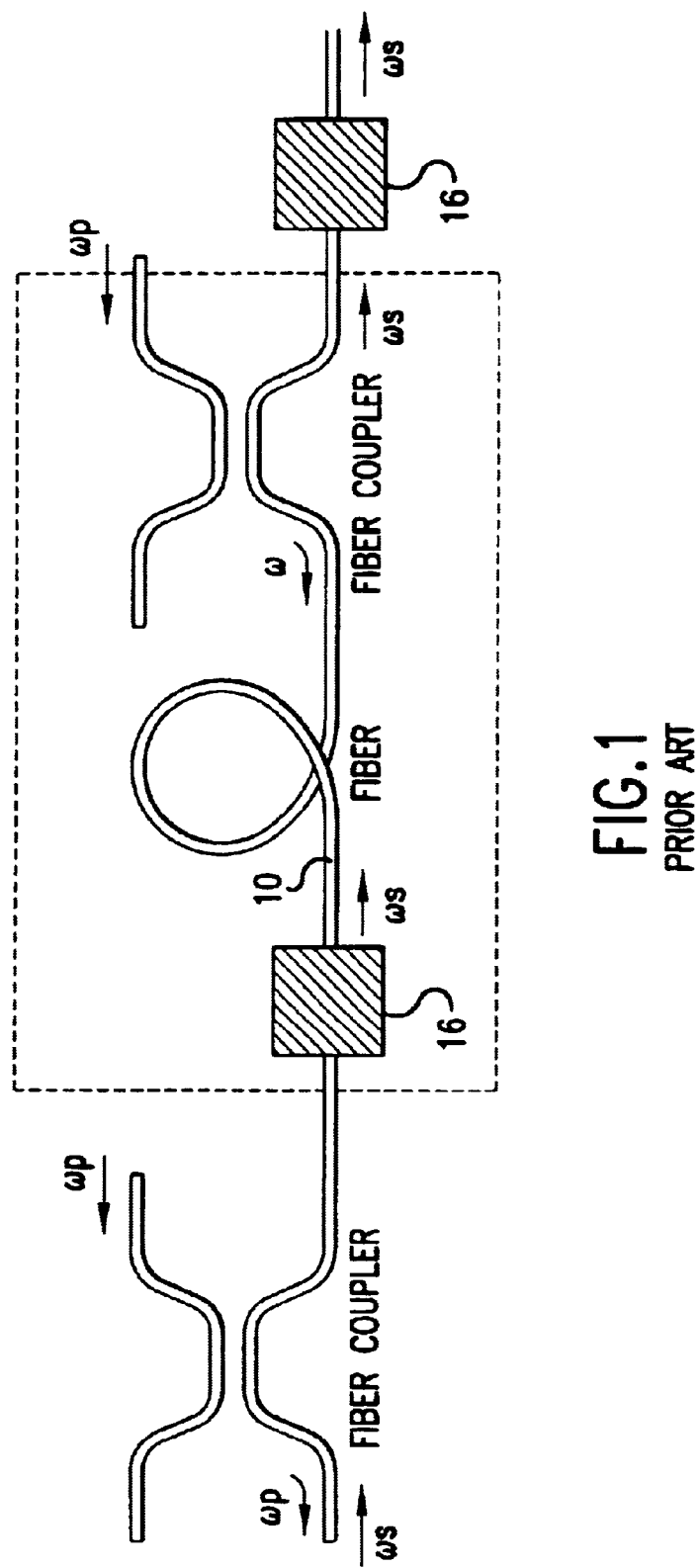
FIG. 1 is a block diagram of a prior art Raman amplifier.
Figure 2A:
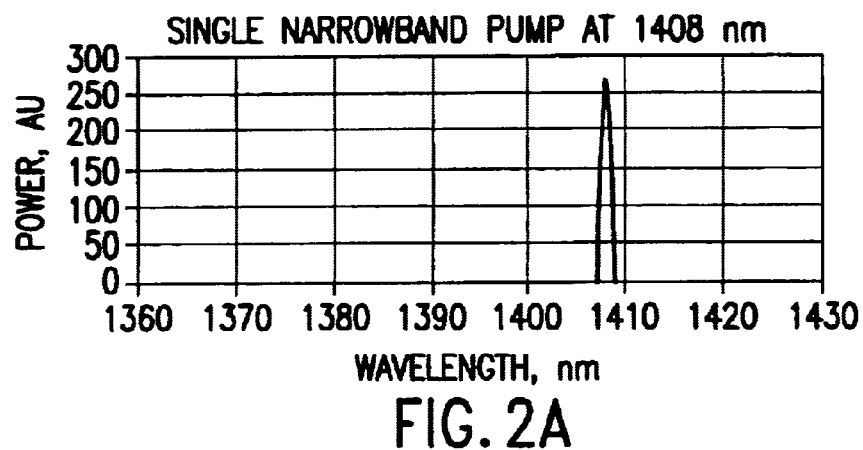
FIGS. 2A–2C are graphs illustrating the gain ripple associated with a prior art multiple pump Raman amplifier.
Figure 2B:
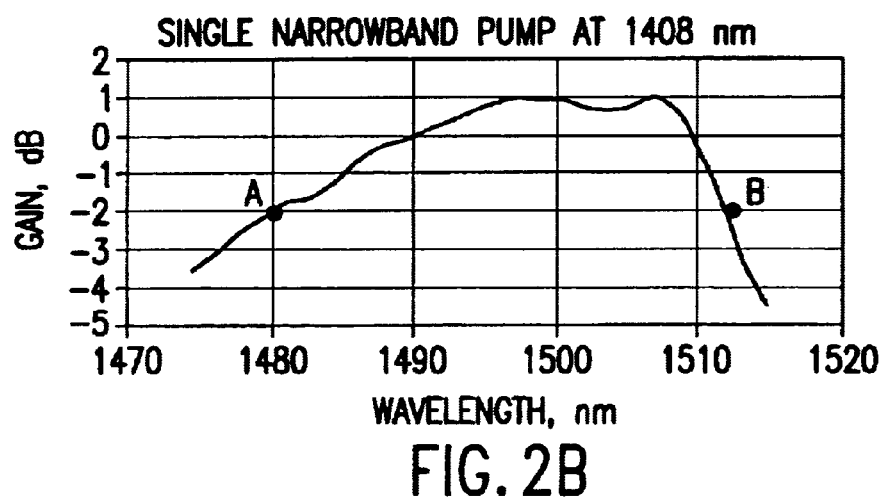
Figure 2C:
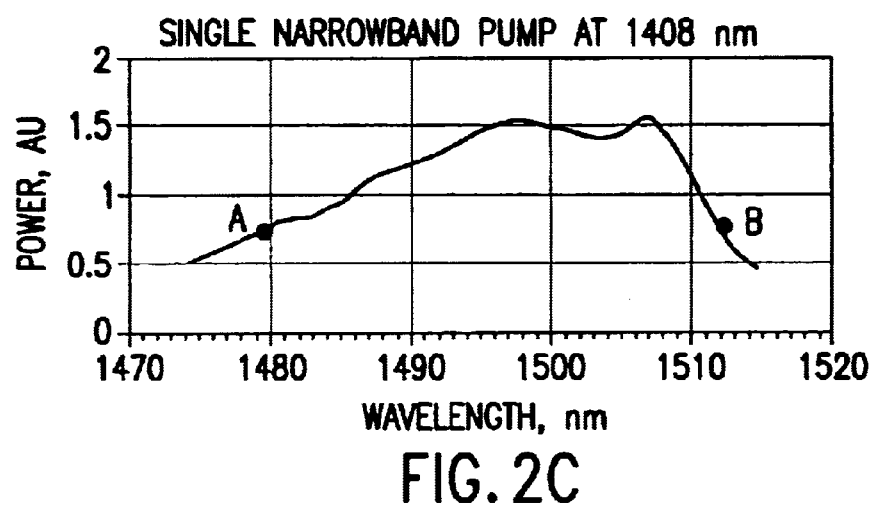
Figure 3A:
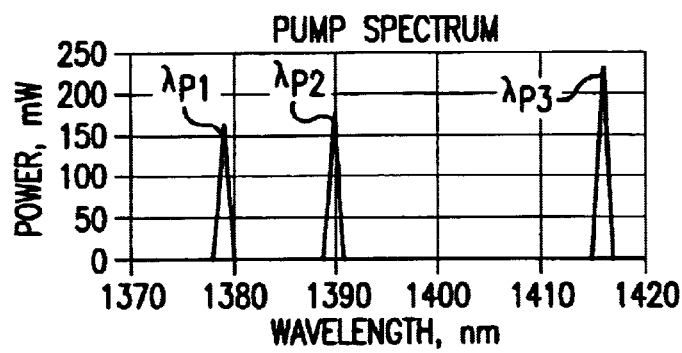
FIGS. 3A–3C are graphs of a Raman gain curve for multiple-pump Raman amplification in accordance with the prior art.
Figure 3B:
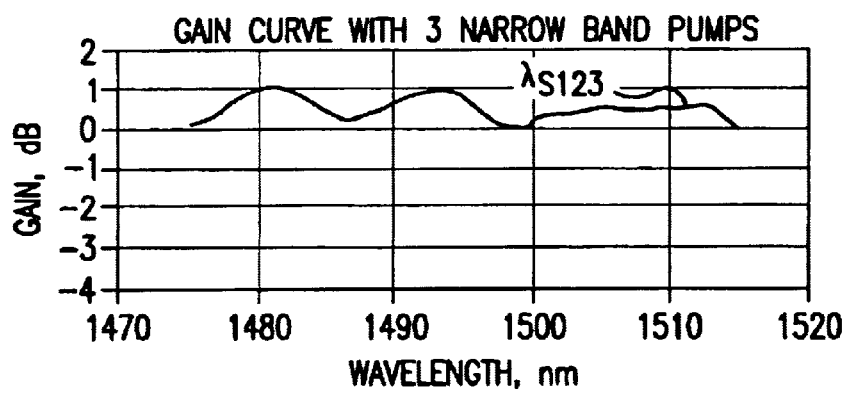
Figure 3C:
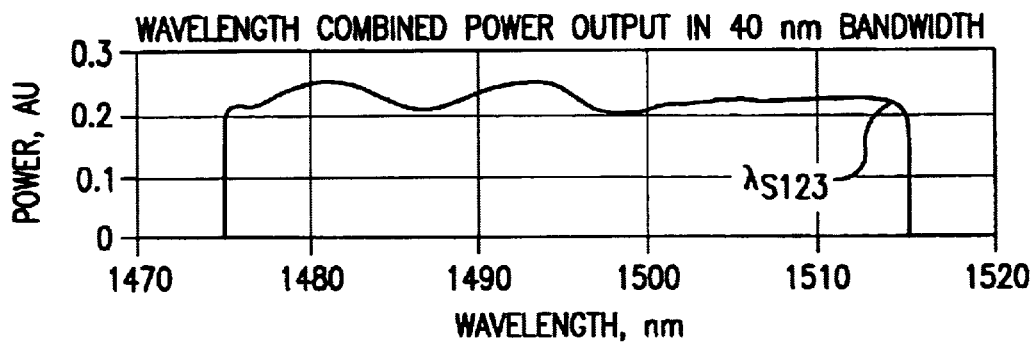
Figure 4:
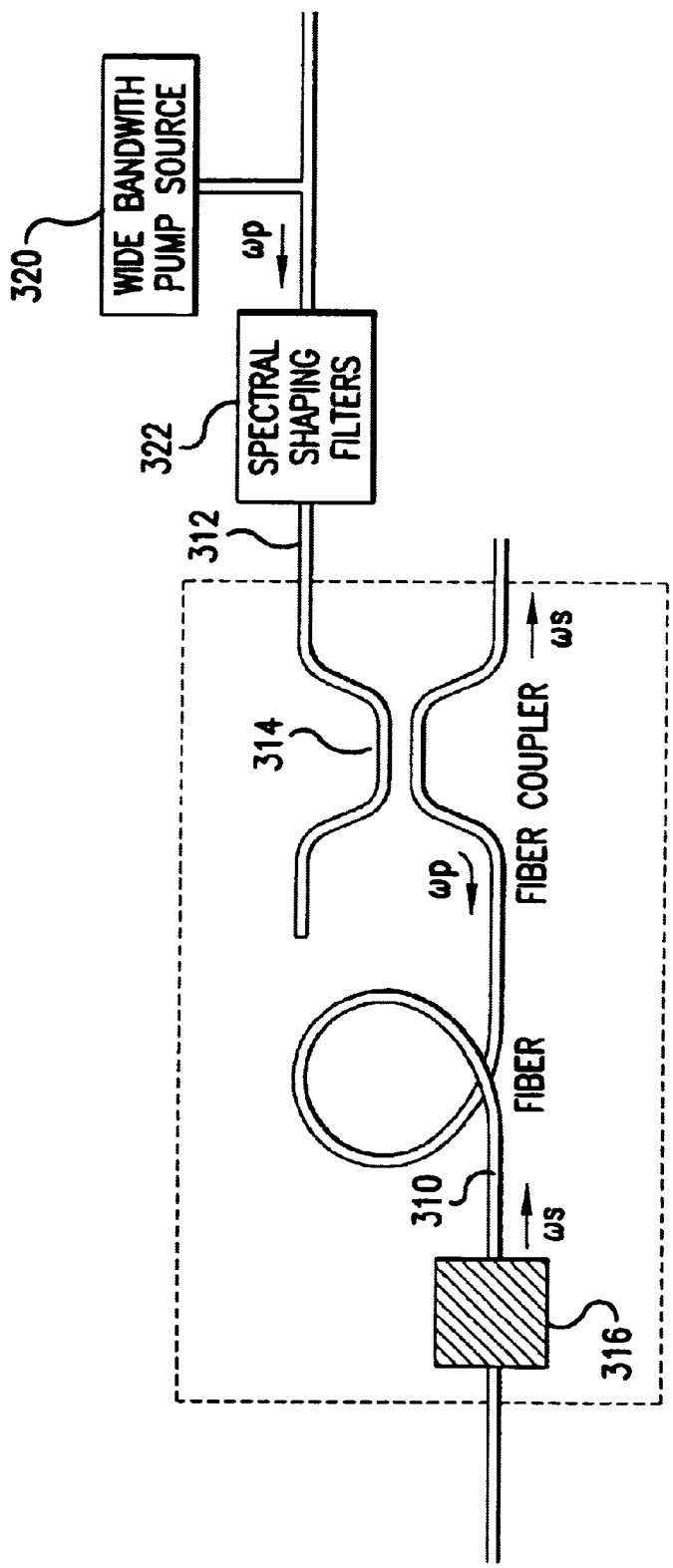
FIG. 4 is a block diagram of a Raman amplifier in accordance with the present invention.

FIG. 4 is a block diagram of a Raman amplifier in accordance with the present invention. As shown in FIG. 4, in accordance with the present invention, a broad bandwidth pump source 320 is utilized to form a continuous wide bandwidth flat pump spectrum. A wide bandwidth pump spectrum is defined as any pump signal having a bandwidth greater than approximately 3 nanometers. Broad bandwidth pump source 320 delivers a wide bandwidth pump signal to pump signal transmission medium 312 for injection onto the Raman-active transmission medium 310 via a fiber coupler 314. The broad bandwidth pump source 320 is capable of producing a continuous wide bandwidth flat pump spectrum. Current technology (e.g., fiber Raman lasers and semiconductor lasers) is limited to producing a wide bandwidth flat pump signal that is less than 10 nm wide. If a wider bandwidth pump signal is desired using existing technology, wide bandwidth pump source 320 may comprise a plurality of wide bandwidth pump sources, and the resulting power spectrum can be controlled, in a known manner, by readjustment of the electrical power of individual pump outputs used with spectrum shaping filters 322 incorporated at the output of the combined pump source. The spectrum shaping filters reshape the spectrum to achieve a desired shape.

The broader the pump continuum, the broader the effective amplifier gain bandwidth and the less gain variation. The resulting combined Raman gain will exhibit substantially no gain ripple within the bandwidth approximately equal to the bandwidth where the pump spectrum is smooth and has the desired shape.

In a situation where Raman cross talk within the broad pump and signal spectrum is absent, a flat pump continuum will provide a Raman amplifier substantially free of ripple gain. However, Raman cross talk, particularly in a broadband pump spectrum, is rarely, if ever, absent and considerably modifies the power distribution between two extreme pump wavelength components, beginning with components that are separated by approximately 10 nm, i.e., it reduces the power of shorter wavelengths. This results in a situation where a long wavelength pump signal is amplified in the field of a shorter wavelength signal leading to power depletion of the shorter wavelength signal. To compensate for this power depletion, in accordance with the present invention, the pump power density is gradually reduced towards the Stokes region in a known manner by spectral shaping of the overall pump spectrum. The exact amount of correction required will usually depend on the particular Raman amplifier parameters and fibers in use; for example, in a two-pump scheme, the longer wavelength pump should be less powerful than the shorter wavelength pump.

Figure 5:
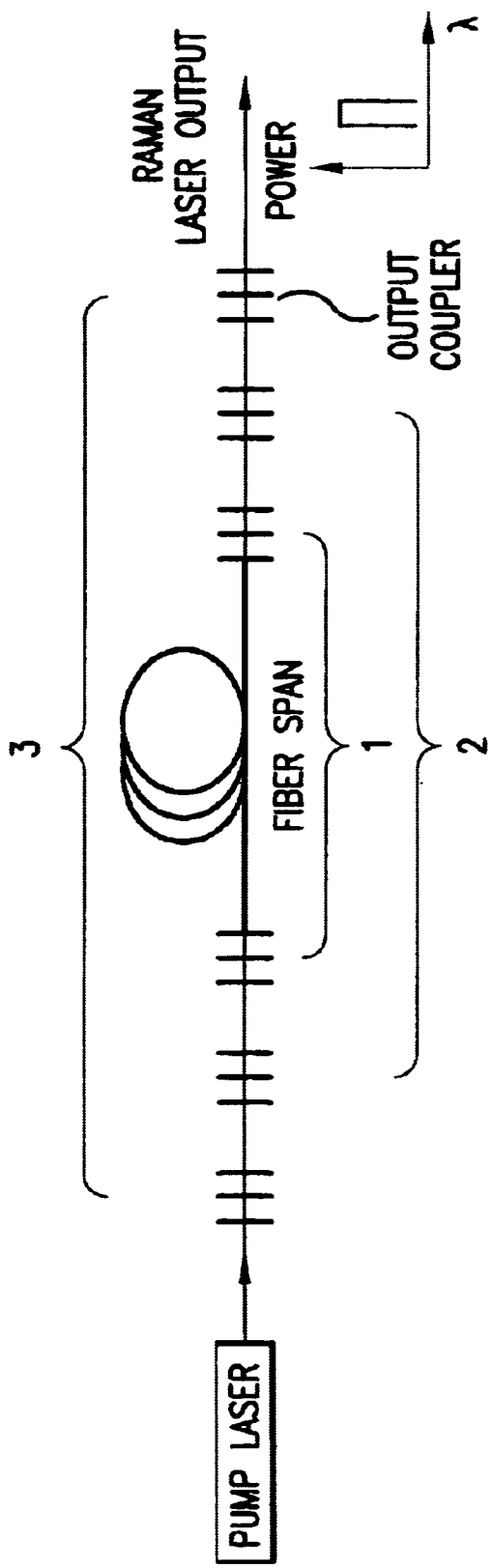
FIG. 5 is a schematic drawing of a Raman pump source that can be used for generating a broadband power spectrum in accordance with the present invention.

A broadband power spectrum as discussed above can be generated utilizing a fiber Raman laser, such as a cascaded Raman laser pumped by a cladding-pumped fiber laser. Fiber Raman lasers can generate high power broadband continuous wave (CW) output at any wavelength in the visible spectral region and near-infrared spectral region. Pump signals can be generated using cascaded Raman Stokes generation where a first Stokes component serves as a pump for a second pump, and the second pump pumps a third, etc., thus enabling the use of powerful pump sources generating at a wavelength near 1 $\mu$m. This is beneficial in view of the availability of high power fiber lasers which can generate wavelengths in the 1 to 1.1 $\mu$m region. FIG. 5 is a schematic drawing of a Raman pump source scheme that may be used for this purpose.

As shown in FIG. 5, fiber gratings 1, 2, 3 comprise a laser cavity for generation of first, second and third Stokes wavelengths and are 100% reflecting except for the output coupler. Three Stokes components are illustrated for the purpose of example only. The actual number of Stokes components will depend on the pump wavelength, the signal wavelength to be amplified, and the type of fiber being used. The bandwidth of reflectivity of the output coupler determines the spectral width of the generated pump signal. Fiber span length can vary considerably, although typically the fiber length is between 20–30 km. The fiber cavities can be formed using silica fibers with the maximum Stokes shift of 440 cm⁻ or other types of fiber, for instance, phosphosilicate fiber with a Stokes shift of 1330 cm$^{-1}$. The latter has been demonstrated to generate radiation at 1.48 nm at a second Stokes shift from the pump wavelength at 1 nm.

Figure 6A:
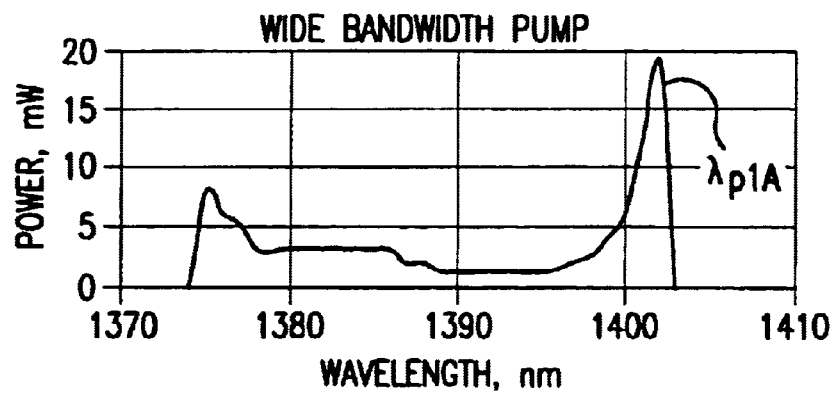
FIGS. 6A–6C are graphs illustrating the gain curve for a wide bandwidth CW pump in accordance with the present invention.
Figure 6B:
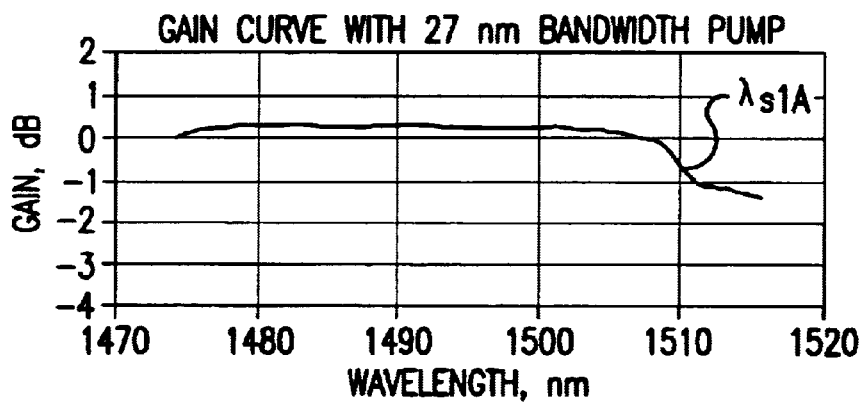
Figure 6C:
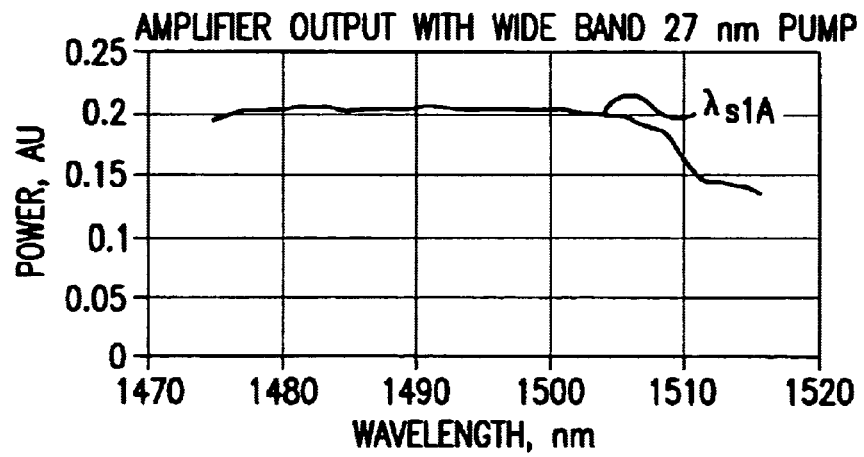

FIGS. 6A–6C illustrate the gain curve for a broad band CW pump in accordance with the present invention. As can be seen, a wide bandwidth pump wavelength $\lambda$p1A, in comparison to the rippled curves illustrated in FIGS. 2B–2C and 3B–3C, achieves a smooth gain curve $\lambda$s1A for the amplified signal.

Figure 7:
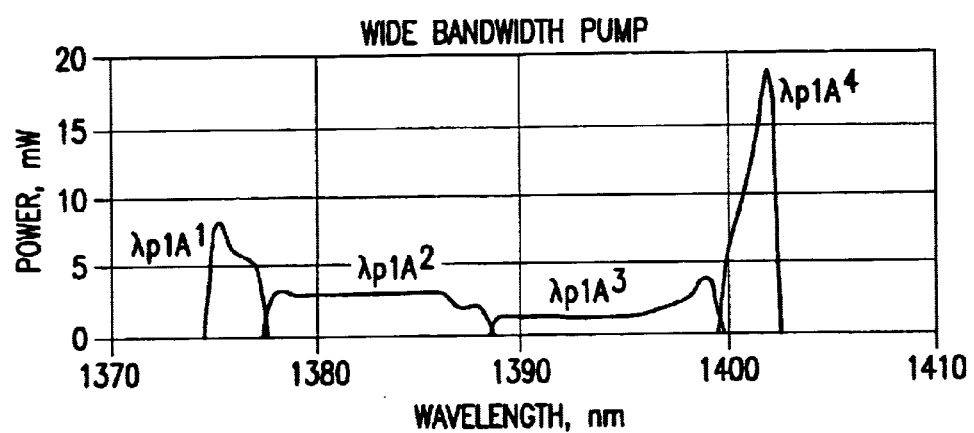
FIG. 7 is a graph illustrating a gain curve for a SCWC pump source showing the plural components forming the substantially continuous spectrum.

FIG. 7 is a graph illustrating a gain curve for a SCWC pump source showing the plural components forming the substantially continuous spectrum. As can be seen in FIG. 7, the gain curve formed by plural pump sources is essentially equivalent to the curve formed by a single pump source illustrated in FIG. 6A. By selecting pump sources to produce pump signals in the spectral regions $\lambda$p1A$^1$, $\lambda$p1A$^2$, $\lambda$p1A$^3$, and $\lambda$p1A$^4$, equivalent ripple-free gain curves/outputs are achievable. As shown in FIG. 7, the "tails" (i.e., the ends) of adjacent wavelength spectra generated by the plural pump sources overlap, thereby eliminating distortion in the composite output pump curve and thus enabling a substantially ripple-free output signal.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A method of generating a substantially ripple-free amplified optical signal, comprising:

causing an information bearing optical signal to be propagated onto a Raman-active transmission medium in a first direction;

causing a wide spectral bandwidth substantially continuous wave composite (SCWC) pump signal to be propagated onto said Raman-active transmission medium in a direction opposite to that of said information bearing optical signal, said SCWC pump signal being formed by a plurality of broadband pump sources; and shaping an overall pump spectrum of said pump signal by adjusting pump power such that positive gain produced by said overall pump spectrum is substantially flat within a wide spectral bandwidth substantially corresponding to a wide spectral bandwidth of said overall pump spectrum.

2. A method as set forth in claim 1, wherein said wide spectral bandwidth SCWC pump signal has a bandwidth of at least 3 nanometers.

3. A method as set forth in claim 1, wherein said wide spectral bandwidth SCWC pump signal has a bandwidth that is greater than the bandwidth of said information-bearing signal.

4. A Raman amplification system, comprising:

a transmission medium coupled to an information-signal source;

a broadband pump source generating a wide spectral bandwidth pump signal spanning a predetermined wavelength spectra having a bandwidth of greater than approximately 3 nanometers;

spectral shaping filters for shaping said predetermined wavelength spectra by adjusting pump power; and a coupler for coupling said wide spectral bandwidth pump signal generated by said pump source to said transmission medium such that positive gain produced by said wide bandwidth pump signal is substantially flat within a bandwidth substantially corresponding to said bandwidth of said wide spectral bandwidth pump signal.

5. A system as set forth in claim 4, wherein said pump source comprises:

a plurality of wide spectral bandwidth pump sources having outputs selected such that the combined outputs of said plurality of wide spectral bandwidth pump sources generate a substantially continuous wave composite pump signal having a combined wavelength spectra equal to said predetermined wavelength spectra.

6. A system as set forth in claim 5, wherein each of said plurality of wide spectral bandwidth pump sources outputs a pump signal having a wavelength spectra smaller than said predetermined wavelength spectra, and wherein the tails of adjacent spectra overlap.

7. The Raman amplification system of claim 4, wherein the pump power density varies across the bandwidth of said pump source to substantially compensate for Raman cross talk.

8. The Raman amplification system of claim 4, wherein said pump source comprises a pump laser, a fiber span coupled to said pump laser, and a plurality of fiber gratings along said fiber span for generation of a plurality of respective Stokes wavelengths.

9. A method of generating a substantially ripple-free amplified optical signal, comprising:

causing an information-bearing optical signal to be propagated onto a Raman-active transmission medium in a first direction;

producing a plurality of broadband pump signals in different spectral regions, each of said broadband pump signals having a wide bandwidth pump spectrum, and wherein adjacent wavelength spectra of said pump signals overlap to from a composite pump signal;

causing said composite pump signal to be propagated onto said Raman-active transmission medium in a direction opposite to that of said information bearing optical signal; and shaping an overall pump spectrum of said composite pump signal by adjusting pump power such that positive gain produced by said pump spectrum is substantially flat within a wide spectral bandwidth substantially corresponding to a wide spectral bandwidth of said overall pump spectrum.

* * * * *

UNITED STATES PATENT AND TRADEMARK OFFICE
CERTIFICATE OF CORRECTION

PATENT NO. : 6,717,963 B1
DATED : April 6, 2004
INVENTOR(S) : Dmitri Foursa

It is certified that error appears in the above-identified patent and that said Letters Patent is hereby corrected as shown below:

Column 2,
Line 26, delete "ωp1, ωp2" and insert -- $\lambda p1, \lambda p2$ --;
Line 27, delete "ωp3" and insert -- $\lambda p3$ --;
Line 29, delete "ωs" and insert -- $\lambda s$ --;

Column 3,
Line 20, delete the word "multiple" and insert the word -- single --;

Column 4,
Line 48, delete "cm¨" and insert -- $cm^{-1}$ --;

Column 6,
Lines 11, 15 and 16, delete the word "spectra" and insert the word -- spectrum --;
Line 36, delete the word "from" and insert the word -- form --.

Signed and Sealed this

Twenty-second Day of March, 2005

JON W. DUDAS
*Director of the United States Patent and Trademark Office*